US005793871A

United States Patent [19]

Jackson

[11] Patent Number: 5,793,871

[45] Date of Patent: Aug. 11, 1998

[54] OPTICAL ENCRYPTION INTERFACE

[75] Inventor: Deborah J. Jackson, West Los Angeles, Calif.

[73] Assignee: California Institute of Technology, Pasadena, Calif.

[21] Appl. No.: 756,993

[22] Filed: Nov. 26, 1996

[51] Int. Cl.$^6$ .......... H04L 9/00

[52] U.S. Cl. .......... 380/54; 380/9; 380/28; 380/33; 380/59

[58] Field of Search .......... 380/9, 10, 28, 380/33, 43, 49, 54, 59, 6, 7, 8

[56] References Cited

U.S. PATENT DOCUMENTS

| | | | |
|---|---|---|---|
| 3,647,275 | 3/1972 | Ward | 380/54 |
| 3,778,128 | 12/1973 | Hannan | 380/54 |
| 4,120,559 | 10/1978 | Abramson et al. | 380/54 |
| 4,972,480 | 11/1990 | Rosen | 380/28 X |
| 5,140,636 | 8/1992 | Albares | 380/54 |
| 5,243,649 | 9/1993 | Franson | 380/9 |
| 5,307,410 | 4/1994 | Bennett | 380/59 X |
| 5,311,592 | 5/1994 | Udd | 380/9 |
| 5,541,994 | 7/1996 | Tomko et al. | 380/54 X |

OTHER PUBLICATIONS

Optical Pattern Recognition For Validation and Security Verification; B. Javidi, Jun. 1994, Orlando, Fla.

Optical Image Encryption Based on Input Plan and Fourier Plan Random Encoding; P. Refregier, Jan. 1995, Conn.

Experimental Demonstration of the Random Phase Encoding Technique for Image Encryption and Security Verification; B. Javidia, G. Zhang, J. Li, Sep. 1996, Storrs, Connecticut.

Optical Network for Real-Time Face Recognition; H. Li, Y. Qiao, D. Psaltis, Sep. 1993, Pasadena, CA.

Optical Information Processing for Encryption and Security Systems; B. Javidi, 1994, Storrs, Conn.

Securing Information with Optical Technologies; B. Javidi, Mar. 1997, Storrs, Conn.

Volyar, A., Image Transmission via a Multimode Fiber Assisted by Polarization Preserving Phase Conjugation in the Photorefractive Crystal, 1991, Applied Physics.

*Primary Examiner*—Bernarr E. Gregory
*Attorney, Agent, or Firm*—Fish & Richardson P.C.

[57] ABSTRACT

An analog optical encryption system based on phase scrambling of two-dimensional optical images and holographic transformation for achieving large encryption keys and high encryption speed. An enciphering interface uses a spatial light modulator for converting a digital data stream into a two dimensional optical image. The optical image is further transformed into a hologram with a random phase distribution. The hologram is converted into digital form for transmission over a shared information channel. A respective deciphering interface at a receiver reverses the encrypting process by using a phase conjugate reconstruction of the phase scrambled hologram.

48 Claims, 8 Drawing Sheets

OPTICAL ENCRYPTION INTERFACE

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to the field of data encryption. More particularly, the present disclosure describes a technique and a system of optical enciphering and deciphering with optical phase information for securely transmitting sensitive information over networks such as the internet and other shared information transmission channels.

BACKGROUND AND SUMMARY OF THE INVENTION

Information exchange and transfer over a shared transmission channel present a challenge to the security of sensitive information. Internet and Intranet are two examples of such a shared information transmission channel in which many computers are connected with one another by local or wide area communication networks. It is therefore possible for any user or an intruder to intercept a package of sensitive data that is transmitted over the shared channel. In particular, the internet is a rapidly growing business forum and securing information transferred through its channels is becoming a major concern for transmitting proprietary information.

Data encryption techniques can be used to increase the security in data exchange and transfer over a shared transmission channel. In its simplest form, data encryption uses a "key" based on a particular algorithm to change the sequence of a package of data that contains a piece of confidential information ("plaintext") so that the data is enciphered or "scrambled" into an form that appears to have no correlation with the embedded confidential information ("ciphertext"). An unauthorized user, who does not have the knowledge of either the encryption method (e.g., the encryption algorithm) or the key formed based on the encryption method, cannot easily decode the information. An authorized user recovers the embedded information in the scrambled data by using a "key" that is constructed based on the encryption method. Therefore, even if the unauthorized user obtains the scrambled data, the knowledge of both of the encryption method and the particular key is needed to decrypt the confidential information embedded therein.

One well-known encryption system is the Data Encryption Standard (DES) adapted in 1977 by the National Bureau of Standards. This is a secret-key cryptosystem to exploit confusion and diffusion techniques, allowing acceptable security using key lengths as short as 64. The number of keys in cryptosystems based on the DES can be as many as 512 keys with the current computational power. However, increased key lengths "cost" significant delays in transmitting and receiving the encoded information.

Two main kinds of cryptosystems are a symmetrical system, i.e., the private key system, and an asymmetrical system, i.e., the public-private key system. The DES symmetric cryptosystems typically encrypt 64 bit blocks of plaintext using a key length of 56 bits. The fundamental building block in DES (referred to as a round) is a single combination of a substitution followed by a permutation of the text, based on the key. The plaintext is encoded through 16 rounds of a function, which usually implements substitution, permutation, XOR, and shift operations on subsets of the text and the key in such a way that every bit of the ciphertext depends on every bit of the plaintext and every bit of the key.

This means that if a single bit of the ciphertext is corrupted during transmission, the entire message may be lost. This is a another weakness of DES-type block ciphers. In each round, a different subset of the elements from the key, $K_i$, are used to perform the encryption (hence $K_1$ is applied during the first round, and $K_i$ is applied during the ith round, etc.). An analogous algorithm is used to decrypt the ciphertext, but the keys are now applied in reverse order, and the shift operations change from left to right.

Given the complexity of the DES algorithm, the speed at which DES is encrypted is a function of the processor characteristics for both hardware and software implementations. For example, Digital Equipment Corporation makes a hardware DES chip which can encrypt and decrypt at a rate of 1 GBit/sec, or 15.6 million DES blocks per second. Software implementations are slower; for example, an IBM 3090 mainframe can encrypt 32,000 DES blocks per second. Typical software implementation performances for microcomputers are listed in the Table 1 herein.

TABLE 1

Encryption Rates using some microprocessors

| Processor | Speed (MHz) | Bus width (bits) | DES Blocks (per/sec) |
|---|---|---|---|
| 8088 | 4.7 | 8 | 370 |
| 68000 | 7.6 | 16 | 900 |
| 80286 | 6.0 | 16 | 1,100 |
| 68020 | 16.0 | 32 | 3,500 |
| 68030 | 16.0 | 32 | 3,900 |
| 80280 | 25.0 | 16 | 5,000 |
| 68030 | 50.0 | 32 | 9,600 |
| 68040 | 25.0 | 32 | 16,000 |
| 68040 | 40.0 | 32 | 23,200 |
| 80486 | 33.0 | 32 | 40,600 |

Another prior-art cryptosystem is the RSA Public Key Cryptosystem available from the RSA Data Security in California. RSA is an asymmetric cryptosystem in which two different keys are used: a public key to encrypt the plaintext and a private key to decrypt the ciphertext. The hardware implementations of RSA are usually about 1000 to 10,000 times slower than a hardware implementation of DES. In software implementations, RSA is generally about 100 times slower than DES.

These numbers will improve as technology advances, but the processing speed of RSA will be difficult to approach the speed of a symmetric cryptosystem. Consequently, RSA is generally not viewed as a replacement for DES or any other fast bulk encryption algorithm. Instead, RSA is often used for secure key exchange without prior exchange of secrets. Hence a long message is encrypted with DES. The message is sent with its DES key encrypted via RSA public key encryption.

Many other prior-art encryption systems are variations of the DES-type encryption. Generally, it is suspected that given the advanced state of computational processors, DES may no longer be safe against a brute-force attack, so alternatives have actively been sought since the late 1980's. In response to this need, several alternatives have been developed and are thought to be competitive with DES in terms of the level of security provided. Examples of these systems include:

(1) Triple DES. This is a variation of DES where the plain text is encrypted with the DES algorithm by three different keys in succession. This is thought to be equivalent to increasing the size of the DES key to 112 bits. Triple encryption of the plaintext is the current method of dealing with misgivings about DES's security, but this is clearly done at the expense of the throughput rate for encrypting and decrypting messages.

(2) REDOC, a block algorithm which has a 20 byte (160-bit key) and that operates on an 80 bit block. All of manipulations, (i.e. substitutions, permutations, and key XOR's) are performed on bytes, which makes it more efficient in software than DES whose initial and final permutations are difficult to efficiently implement in software. In addition, the 160 bit key usually makes this algorithm very secure.

(3) Khufu is a recently proposed 64 bit block cipher, which calls for a 512-bit key, and leaves the number of rounds open (either 16, 24, or 32). Because of the large key, and the potentially expanded number of rounds, the security of this algorithm is expected to be very high. However, increasing the number of rounds has the disadvantage of slowing the rate at which data can be encrypted.

(4) IDEA is a 64-bit block cipher which uses a 128 bit key. It usually utilizes three basic operations, XOR, addition modulo $2^{16}$, and multiplication modulo $2^{16}$. The algorithm typically operates on 16-bit sub-blocks, which makes it efficient, even on 16 bit processors. Its current software implementations are about as fast as DES.

In view of the limitations and disadvantages of the various prior-art encryption systems, the inventors of the present invention developed a new cryptosystem based on optical phase modulation and a corresponding implementation interface between a user computer and the network. The present invention teaches optically enciphering information embedded in a digital bit stream prior to digitization and transmission over a shared network such as the internet. A holographic de-scrambler is used at the receiving end by an authorized user to decipher the information. One of many advantages of the present invention is the potential to achieve high rate of encryption/decryption (e.g., larger than 1 Gbit/s) as optical fiber networks of high data rates (e.g., larger than 2.4 Gbit/s) become more common.

In one of several preferred embodiments of the present invention, a package of digital data is first imprinted on a carrier light beam. This is done by using a two-dimensional spatial light modulator. The phase of the data-bearing optical waveform is subsequently distorted by a phase-scrambling medium. Next, the data-bearing optical waveform with distorted phase is used to form an optical hologram with a reference beam. The hologram is then converted into electronic signals which are sent to its destination in digital form over a shared transmission channel. At the destination where the scrambled data is received, the hologram is displayed in a spatial light modulator and a conjugate reconstruction thereof is performed to generate a conjugate of the data-bearing signal waveform with distorted phase. A holographic medium having information indicative of the phase-scrambling medium is used to unscramble the phase and the embedded data is retrieved from the conjugate reconstruction optical waveform by using a light detector array such as a CCD array.

One aspect of the present invention is to achieve optical encryption keys up to and greater than $10^6$ keys to enhance the security. This is a difficult implementation for the prior-art systems. Such a large number of encryption keys is possible because of the unique optical analog technique in accordance with the present invention.

It is another aspect of the present invention to insure fast enciphering and deciphering of a large encryption key that are rarely obtainable with the prior-art systems. The preferred embodiments implement this by using the high-speed optical reconstruction of a data-bearing hologram and the capability of parallel processing of optical data processing devices.

It is yet another aspect of the present invention to increase the confidentiality of the encryption schemes by using unconventional analog-based enciphering and deciphering of digital data. This aspect is particularly advantageous in view of the current lack of a theoretical foundation for decrypting analog-based encryption. A brutal-force-attack decryption based on algorithm techniques is nearly impossible for invading the cryptosystems in accordance with the present invention.

It is yet another aspect of the present invention to use optical phase information in a nonobvious way to encipher and decipher digital data.

It is yet another aspect of the present invention that optical holographic techniques are used in both enciphering and deciphering processes to further enhance the confidentiality of the encryption systems in accordance with the present invention. In particular, detailed information on hardware configuration used in recording the data-bearing holograms is needed to undo the encryption even if the optical encrypting process is known.

It is yet another aspect of the present invention that the phase conjugate reconstruction of data-bearing holograms are implemented in preferred embodiments to ensure the high fidelity of the analog deciphering process.

It is yet another aspect of the present invention to integrate optical processing technology, hardware encryption, opto-electronic interfacing, and high-fidelity and fast-speed digital signal transmission to form a highly secure, fast and versatile encryption system that works independent of the transmission media utilized.

It is still another aspect of the present invention to complete the encryption or decryption process in a single step, instead of the 16 rounds of complex computations typically found in most symmetric encryption schemes. In the optical encryption systems in accordance with the present invention, the encrypting speed is usually not limited by the size of the encryption key, but rather by the system speed in converting between the electronic-to-optical and the optical-to-electronic information modes.

BRIEF DESCRIPTION OF THE DRAWINGS

These and other advantages of the present invention will become more apparent in the light of the following detailed description of preferred embodiments thereof, as illustrated in the accompanying drawings, in which.

DESCRIPTION OF THE PREFERRED EMBODIMENTS

Figure 1:
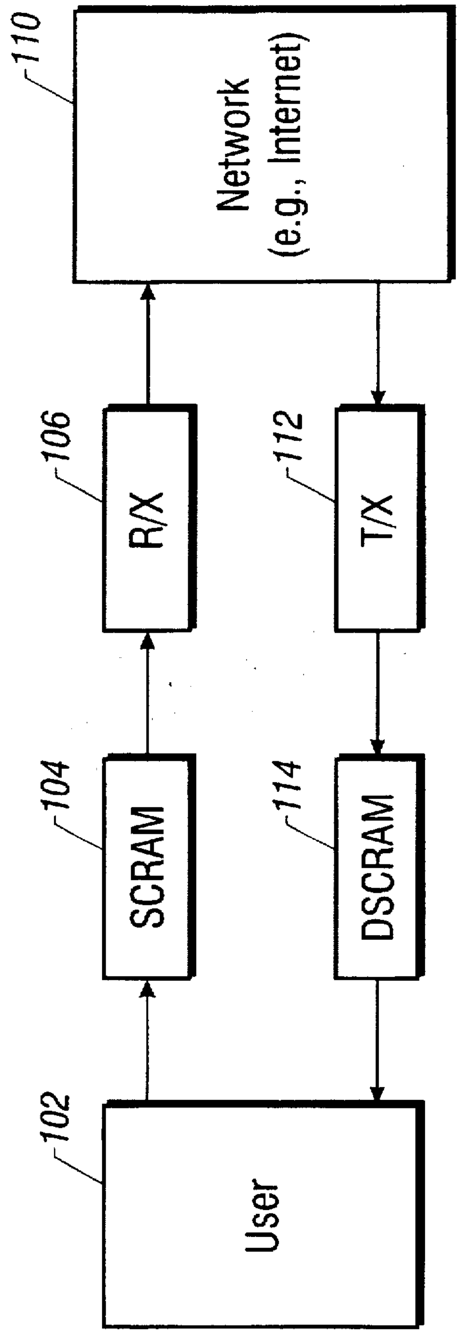
FIG. 1 depicts the interfacing of the optical enciphering/deciphering system with the user computers and the transmission network.

FIG. 1 illustrates the integration of user computers in a network via the optical encryption and decryption interface in accordance with the present invention. The data from a user 102 is converted and imprinted to an optical beam with scrambled phase in an optical scrambling device 104. The encrypted data imprinted in the optical beam is then converted back to electronic signals and transmitted over a network 110. The received encrypted data is first checked by a electronic receiver 112 to determine if the packet is optically encrypted. If so, an optical descrambling device 114 restores the scrambled phase to convert the data back to the original sequence and format. Otherwise, the received data packet is sent directly to the user 102.

Figure 2A:
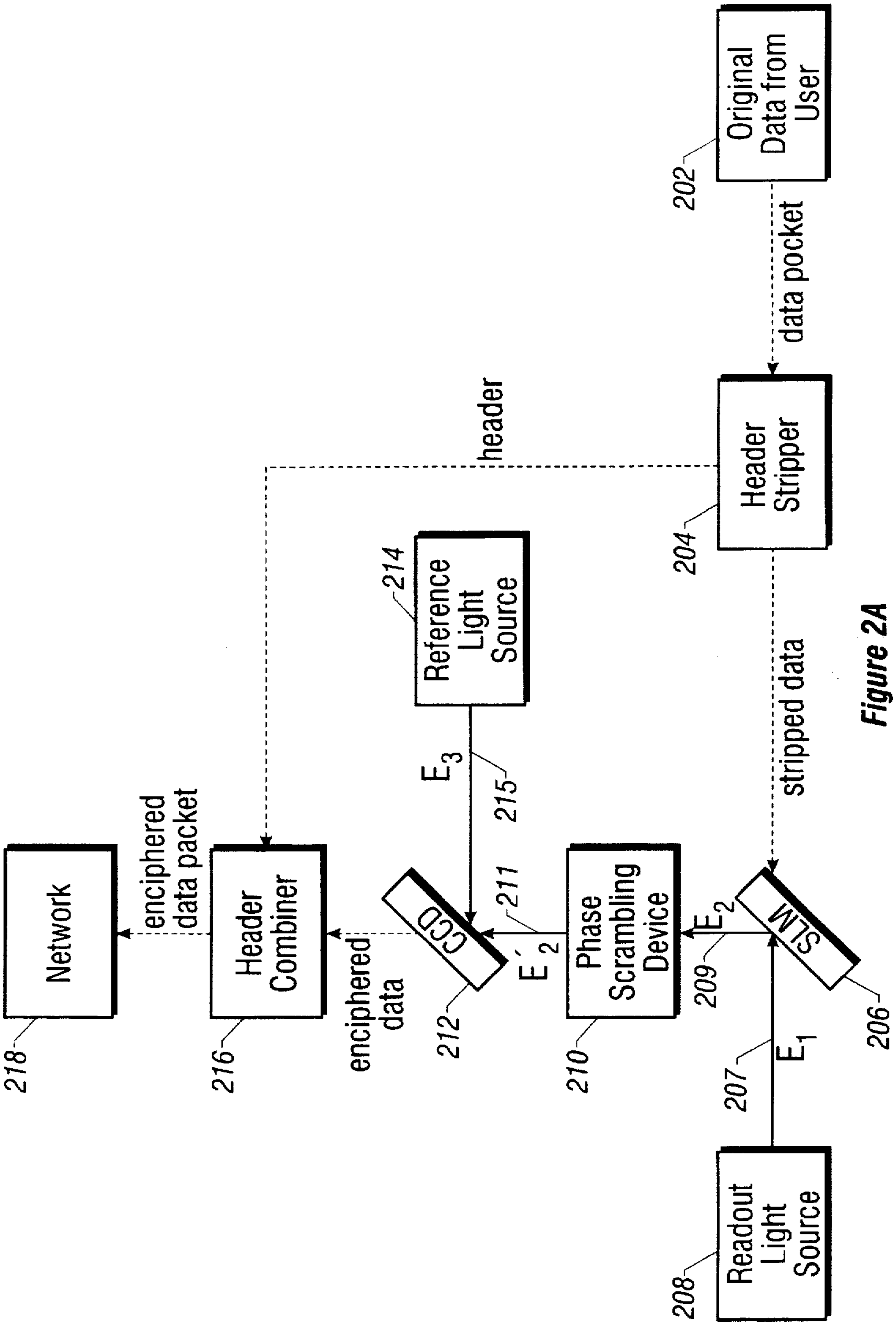
FIG. 2*a* shows the first embodiment of the optical enciphering device in accordance with the present invention.
Figure 2B:
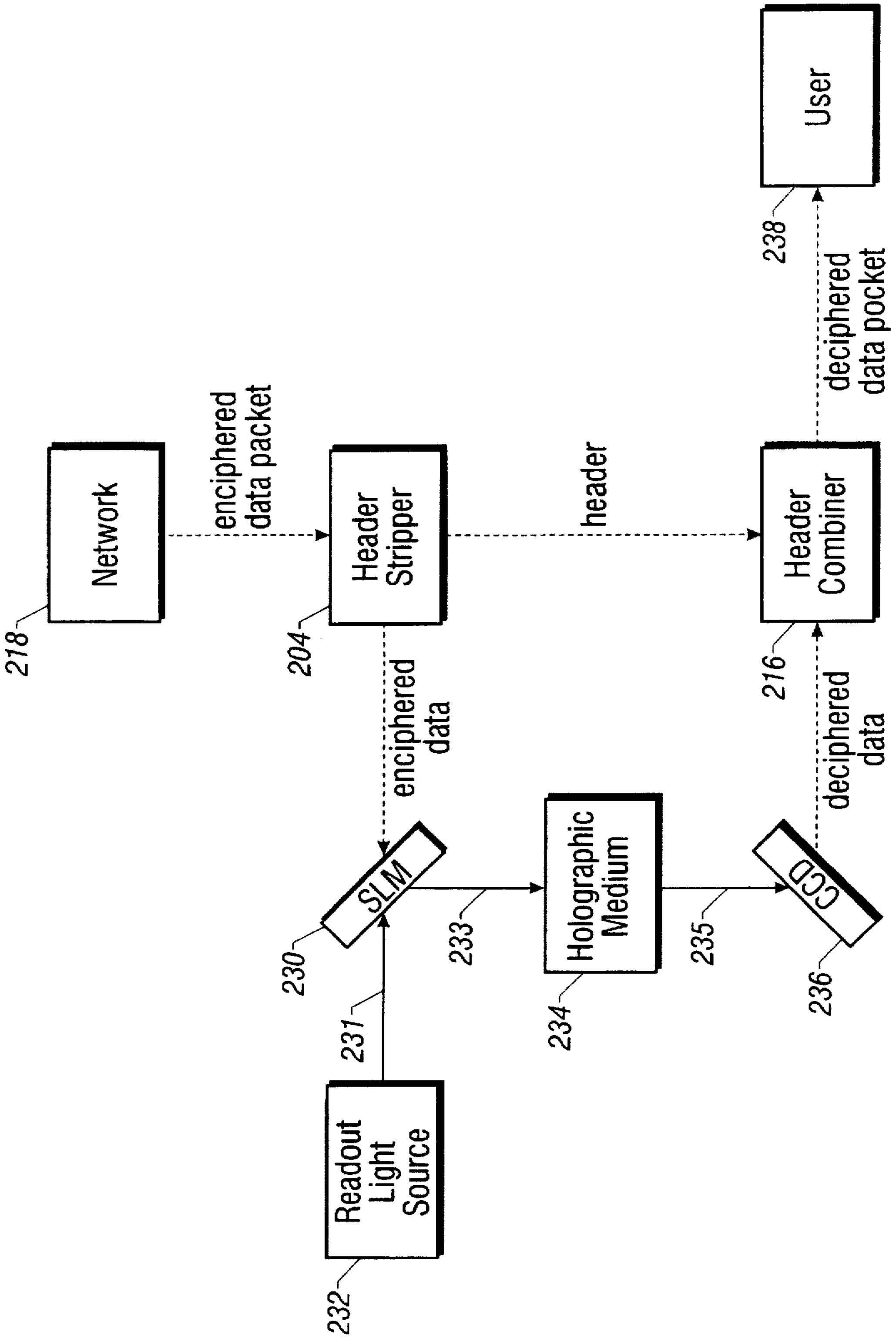
FIG. 2*b* shows the first embodiment of the optical deciphering device corresponding to the enciphering device in FIG. 2*a*.

A first embodiment of the optical scrambling device 104 and the respective optical descrambling device 114 is shown in FIG. 2*a* and FIG. 2*b*. The scrambling mechanism in FIG. 2*a* includes a spatial light modulator (SLM) 206, a phase scrambling device 210 and a light detector array 112 (e.g., a CCD array). Two mutually coherent beams including a readout beam 207 and a reference beam 215, can be produced by one light source or two light sources 208 and 214 as shown. One example of the light source is a laser such as a solid-state laser (e.g., a diode laser). Additional optical elements such as a spatial filter and a beam expander may also be included in the light source.

Digital information is usually transmitted by respective data packets. The following description of the preferred embodiments of the present invention assumes that a TCP/IP protocol is used for data transmission over a network. However, practice of the present invention is not limited to a particular protocol including TCP/IP. The choice of the TCP/IP protocol is merely used as an example herein to illustrate how issues such as reserving the routing headers and information on packet length could be handled. It will be understood that the basic implementation of the optical cryptosystems is expected to be transparent to the choice of protocol or whether the data arrives in an electronic or optical (in the case of fiber optic links) form. The input data is preferably in digital form.

In the specific case of the TCP/IP protocol, digital information is grouped into packets for transmission on the network. Each packet has a header that contains information indicating the packet's destination, its origin, type, priority level, error correction parity bit, etc. Assuming variable packet lengths, additional information is embedded in the header to keep track of packet sizes as well.

Since more than one packet would be read into the SLM 206 for encryption, the function of the header stripper 204 would be to read the headers and group packets destined for the same institutional destination into a common buffer so that they are read into the SLM 206 and encrypted as a group. Part or all of the original routing, originator, priority, and error correction parity bit details within the original header can be left embedded in the data stream at this point to be encrypted with the data, or removed and buffered to be recombined later with the data after decryption.

The digital data packets are loaded into the SLM, 206 filling the pixel up line by line with one byte (8 bits) per pixel. The data in the stripped packet is encrypted optically and the resultant encrypted digital data is combined with a newly created master header that provides the site-to-site routing information. The ciphertext is then packaged for transmission with the master header, error correction coding, and other bookkeeping information added if necessary. The ciphertext may also be broken up in appropriate packet lengths.

In the first embodiment of the scrambling device shown in FIG. 2*a* and other embodiments disclosed herein, the pixels of the SLM 206 and the detection pixels of the CCD 212 have a relation of one-to-one mapping with respect to each other. This can be done by phase conjugate reconstruction of the holograms and by using imaging optical elements (not shown).

In operation, a stripped data packet from the header stripper 204 is used to electrically address the two-dimensional pixel array of the SLM 206. Thus a data stream in the time-domain is converted into a two-dimensional spatial image on the SLM 206. The readout beam 207 is modulated by the pixel array of the SLM 206 the SLM 206 is modulated to produce a beam 209 whose wavefront is imprinted with the 2D image indicative of the data from the user 202.

The collimated readout beam 207 at the SLM 206 can be written as $$E_1(r,t)=E_o \exp i[\omega t-k_1\cdot(r-r_o)], \tag{1}$$

where $r_0$ is the spatial position vector of the wavefront at the output of the readout light source 208, $E_o$ is the amplitude of the electric field, $\omega$ is the angular frequency, t is the time variable, and $k_1$ is the wave vector of the beam 207, respectively.

It will be understood that the above equation and the equations therebelow are intended to only illustrate the flow of the optical processes involved and should not be construed as precise representation of each process. For example, the diffusion effect by optical diffraction is not explicitly included in these equations.

The imprinted beam 209 can be expressed as $$E_2(r,t)=E_oF(h_m,Y_n) \exp i[\omega t-k_2\cdot(r-r_1)], \tag{2}$$

where factor $F(h_m,y_n)$ has the information from the image of a pixel in the mth row and nth column in the 2D pixel array of the SLM 206, $h_m(x_m,z_m)$ represents the rectangular coordinates of the SLM 206 in a plane of the paper, $y_n$ represents the SLM rectangular coordinate along the axis perpendicular to the paper, and $r_1$ is the center position vector of the SLM 206, $r_2$ is the center position vector of the CCD 212, respectively.

Next, the imprinted beam 209 propagates through the phase scrambling device 210, thus resulting a beam 211 with a scrambled phase. The beam 211 can be written as $$E'_2(r,t)=E_oF(h_m,Y_n) \exp i[\omega t-k_2\cdot(r-r_1)+\theta(x,y)], \tag{3}$$

where $\theta(x,y)$ represents the scrambled phase component in a plane perpendicular to direction of $k_2$. This scrambled phase $\theta(x,y)$ causes the image imprinted in the optical beam 211 to be unintelligible or have an appearance that has no correlation with the unscrambled image at the SLM 206. In effect, the data has been encrypted optically by the phase scrambling device 210. An intruder who obtains a copy of the scrambled data converted from the beam 211 cannot retrieve the information embedded therein by analog techniques without having the information of the scrambled phase θ(x,y) and corresponding hardware to unscramble the phase.

The present invention goes another step further to enhance the security of the phase encryption. The scrambled image in the beam 211 is further converted into holographic form to achieve an additional enhancement in security. This is done by interfering the beam 211 with the reference beam 215 which is a collimated beam:

$$E_3(r,t)=E_o \exp i[\omega t-k_3\cdot r]. \quad (4)$$

The phase and amplitude distribution of the interference pattern captured by the CCD 212 can be expressed in a simplified form as the following if the polarizations of the two writing beams are parallel to each other:

$$|E_{TOT}(r,t)|^2 = |E_o|^2(1+|F|^2) + \quad (5)$$
$$|E_o|^2F(\hat{k}_2\cdot\hat{k}_3)\exp\{-i[k_3\cdot r+k_2\cdot(r_2-r_1)-\theta]\}$$
$$|E_o|^2F^*(\hat{k}_2\cdot\hat{k}_3)\exp i[k_3\cdot r+k_2\cdot(r_2-r_1)-\theta]$$

where n is the unit vector normal to the pixel array surface of the CCD 212 and $r_2$ is the center position vector of the COD 212, respectively. This hologram can be faithfully reconstructed with the knowledge of the polarization, wavelength, and propagating direction of the two writing beams 211 and 215 during writing the hologram. These parameters all play a role in preventing the proper reconstruction of the hologram from an unauthorized user.

The COD 212 converts the optical interference pattern into 2D electrical signals which is further transformed into a digital data stream in time domain as an encrypted packet. The header combiner 216 repackages the encrypted packet including error correction and subdividing into smaller packets as needed for transmission over the network. This completes the encryption and the encrypted data packet is subsequently sent over the network.

FIG. 2b shows the respective descrambling interface to decipher the data from the scrambling interface as in FIG. 2a. A header stripper 204 removes the header from the encrypted data packet from the network. The encrypted data is used to electrically address a 2D pixel array of a SLM 230 based on the conversion from the 2D image in the CCD 212 into a data stream in the encryption process. The 2D image is in fact a reproduction of the interference pattern on the CCD 212 in FIG. 2a. A readout beam 231 from a readout light source 232 imprinting on the SLM 230 is modulated to produce a beam 233 whose wavefront is thus imprinted with the 2D image on the SLM 230. The readout beam 231 is chosen to be a counter-propagating beam of the writing reference beam 215 in the encryption process as in FIG. 2a (i.e., $k_4=-k_3$):

$$E_4(r,t)=E_o \exp i[\omega t-k_4\cdot r]. \quad (6)$$

Therefore, the detailed information regarding the original reference beam 215, including the wavelength, polarization, and propagation direction, is required to produce the proper readout beam 231 for decryption of the data. This will uniquely select the conjugate term in the hologram represented by Equation (5). The phase conjugate reconstruction of the hologram stored in the SLM 230 propagates as a beam 233 in the opposite direction of the beam 211 and retrace the path of the beam 211. This phase conjugate reconstruction can be represented by the following:

$$E_4(r,t)|E_{TOT}(r,t)|^2=E_o|E_o|^2F^*(h_m,y_n)(\hat{k}_2\cdot\hat{k}_3)\times \exp i[\omega t+k_2\cdot(r_2-r_1)-$$
$$\theta(x,y)]. \quad (7)$$

The image represented by Equation (7) is still unintelligible or has no apparent correlation with unencrypted data due to the scrambled phase θ(x,y).

To undo the scrambled phase, the conjugate reconstruction beam 233 needs to retrace the original path of the beam 211 through the phase scrambling device 210. This can be accomplished by using a holographic medium 234 with the phase scrambling information of the phase scrambling device 210 that is located in the optical path of the conjugate reconstruction beam 233. It is desirable that the optical path length between the SLM 230 and the CCD 236 be substantially identical to that between the CCD 212 and the SLM 206 in the scrambling interface as in FIG. 2a (after accounting for differences in waveguide propagation properties of the phase scrambling medium and the holographic descrambler). In addition, the holographic medium 234 needs to be disposed at the same location relative to the SLM 230 and the CCD 236 as the phase scrambling device 210 relative to the CCD 212 and the SLM 206. Since the phase conjugate wave is effectively the time reversed form of the original image wavefront, it will essentially unscramble the diffractive effects of the beam propagation.

The unscrambled image in the beam 235 is a reproduction of the image imprinted in the beam 209 shown in FIG. 2a except a scaling factor in amplitude. The beam 235 is sensed by the CCD 236 and converted into deciphered data stream. The original data packets in the form sent out by the user 202 can now be extracted from the deciphered data. Finally, all deciphered data packets are combined to retrieve the information.

Figure 3:
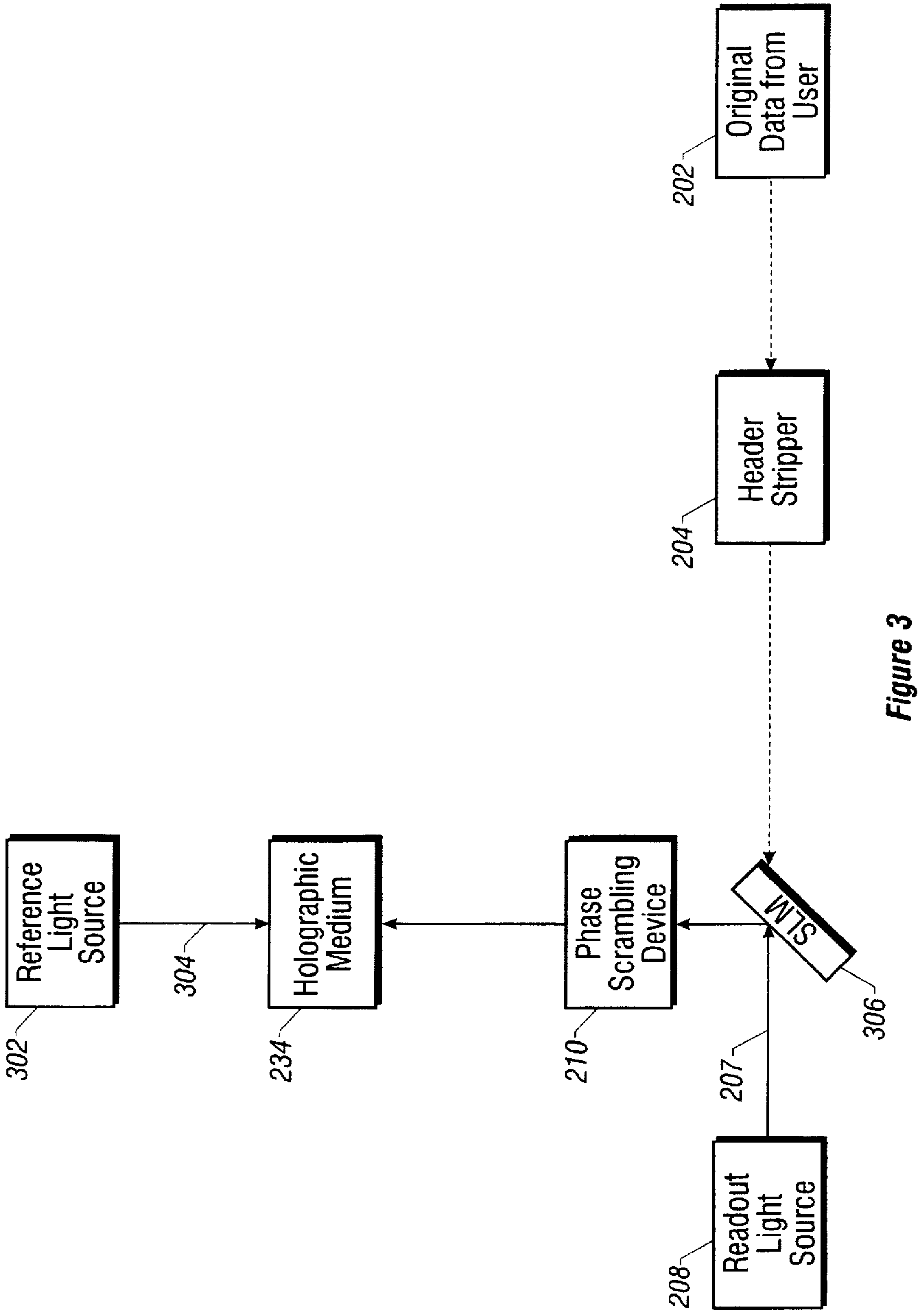
FIG. 3 illustrates making a holographic copy of a phase deciphering device.

The operation of recording the phase scrambling information in the holographic medium 234 is shown in FIG. 3. The holographic medium 234, such as a holographic film, is placed between the scrambling medium 210 and the CCD 212 of FIG. 2a. The CCD 212 is then removed so that the holographic medium 234 can be addressed by a reference beam 304 as shown in FIG. 3. A beam reflecting element 306 is in the location of the SLM 206. The beam reflecting element 306 can be the SLM 206 operating in reflecting mode or a mirror. The beam 207 is directed to the phase scrambling device 210 and the holographic medium 234 following the optical path of the beams 209 and 211 of FIG. 2a. A reference beam 304, propagating in the opposite direction with the beam 207, interfere with the beam 207 to record a hologram in holographic medium 234. The phase information θ(x,y) of the phase scrambling device 210 is therefore recorded in the hologram in the holographic medium 234. This holographic media 234 can be used in the scrambling interface as in FIG. 2a to function as the phase scrambling device 210 in addition to its function in unscrambling the phase shown in FIG. 2b. Multiple copies of this holographic medium 234 can be made for use in different scrambling and descrambling devices for different authorized users in the network. In particular, each holographic medium can be made to have a unique characteristic, thereby enhancing the confidentiality in computer security applications such as privacy enhanced mail on the Internet. Therefore, either the phase scrambling device 210, a SLM operating in transmission mode to generate random phase distortion, or other means to produce phase scrambling, can be replaced by a holographic medium that is recorded with information of phase scrambling.

Accordingly, "Phase scrambling device" will be used hereinafter to represent any phase scrambling element that can produce any desired phase distortion that is suitable for the optical encryption in accordance with the present invention.

The above optical analog encryption has two steps. First, the 2D optical image indicative of the original digital data is distorted by a phase scrambling device. Secondly, the distorted 2D image is transformed into holographic form. Information of both optical processes and corresponding hardware are required in order to correctly reconstruct the hologram and undo the phase scrambling.

In addition, the above enciphering and deciphering is fast due to the use of optical processing. For example, the phase scrambling and record/reconstruction of the hologram takes place in a duration for light to travel from the CCD to the SLM in both scrambling and descrambling interfaces in FIGS. 2*a* and 2*b*. The optical processing speed is further increased by optical parallel processing of the 2D images converted from a serial data stream. The processing speed of the optical enciphering and deciphering of the preferred embodiments of the present invention is usually limited by the speed to electrically address the SLM and the response speed in the readout of the CCD rather than the complexity of the particular encryption methodology in the prior-art systems. The high encryption speed of the optical encryption systems in accordance with the present invention allows large encryptions keys that are difficult to implement in the prior-art systems using either software encryption or electronic hardware encryption.

In many prior-art encryption systems, if any of the 64-bits of the ciphertext is corrupted, the whole message often becomes undecipherable and is lost. This is because every bit of the ciphertext often depends on every bit of the plaintext as well as every bit of the key in the prior-art encryption systems. In the preferred embodiments of the present invention, the effect of corrupting a single bit can be reduced by adding redundancy in the transmission of the optically encrypted data. That can be done by encoding adjacent pixels or multiple pixels throughout the SLM with the same information. Therefore, the data can still be deciphered despite the corruption of a transmitted bit.

One example of the phase scrambling device according to the present invention is a multi-mode optic fiber or other waveguiding medium. A 2D optical image converted from a serial digital data stream is effectively decomposed into a linear superposition of the eigen modes of the optical waveguiding medium. Each pixel of the 2D image at the entrance of the waveguiding medium with a length of L and M×N modes can be represented by $$f_1(x, y, z=0, t) = \sum_{m=0}^{M} \sum_{n=0}^{N} A_{mn} E_{mn}(x, y) e^{i\omega t}, \qquad (8)$$

where x and y are the coordinates of the cross section of the waveguiding medium, z is the longitudinal coordinate along the waveguiding medium, $A_{mn}$ and $E_{mn}$ are the mode coefficient and mode electrical field for mode (m,n), respectively.

Each mode propagates in a unique way in the waveguiding medium and has a different phase delay from the other modes. Therefore, the net effect of transmitting the image through the waveguiding medium is scrambling the phase of the 2D optical image. At the output of the waveguiding medium, each pixel is transformed into the following distorted form:

$$f_2(x, y, z=L, t) = \sum_{m=0}^{M} \sum_{n=0}^{N} A_{mn} E_{mn}(x, y) e^{i(\omega t - \beta_{mn} L)}, \qquad (9)$$

where $\beta_{mn}$ is the propagation constant for mode (m,n). Thus, the 2D image is encrypted. Decryption involves the use of a hologram having the phase information of the waveguiding medium in a conjugate reconstruction to produce an undistorted version of the original image as described thereabove. In addition, the hologram can also be used in encryption in place of the waveguiding medium.

The resolution of the 2D image that can be enciphered and deciphered will be the total number of modes that can be handled by the waveguiding medium $N_w \times M_w$, which also represents the effective length of the encryption key size that can be handled by the optical encryption. Preferably, the dimensions of the waveguiding medium may be chosen so that it can support many CCD array. If each pixel at the CCD and the SLM has an 8-bit grey scale resolution, G, the real key size is thus determined by the resolution of the CCD, N×M×G. Similarly, the effective block size is determined by the spatial and grey scale resolution, G, of the SLM (i.e. N×M×G). If N=M=128, this embodiment allows one to easily work with both key and block sizes that exceed 100,000-bits in length. In addition, the polarization and the wavelength of the light source used to encrypted the image may also be required for deciphering. If there are P=36 different possible polarization orientations, the number of possible wavelengths is W=10, and N=M=128, the corresponding optical encryption key is thus on the order of $(M\times N)\times P\times W=4.6\times10^6$. Such a large encryption key is possible according to the present invention because of the intrinsically parallel nature of optical processing in both encoding and decoding large blocks of data in a single step.

Figure 4A:
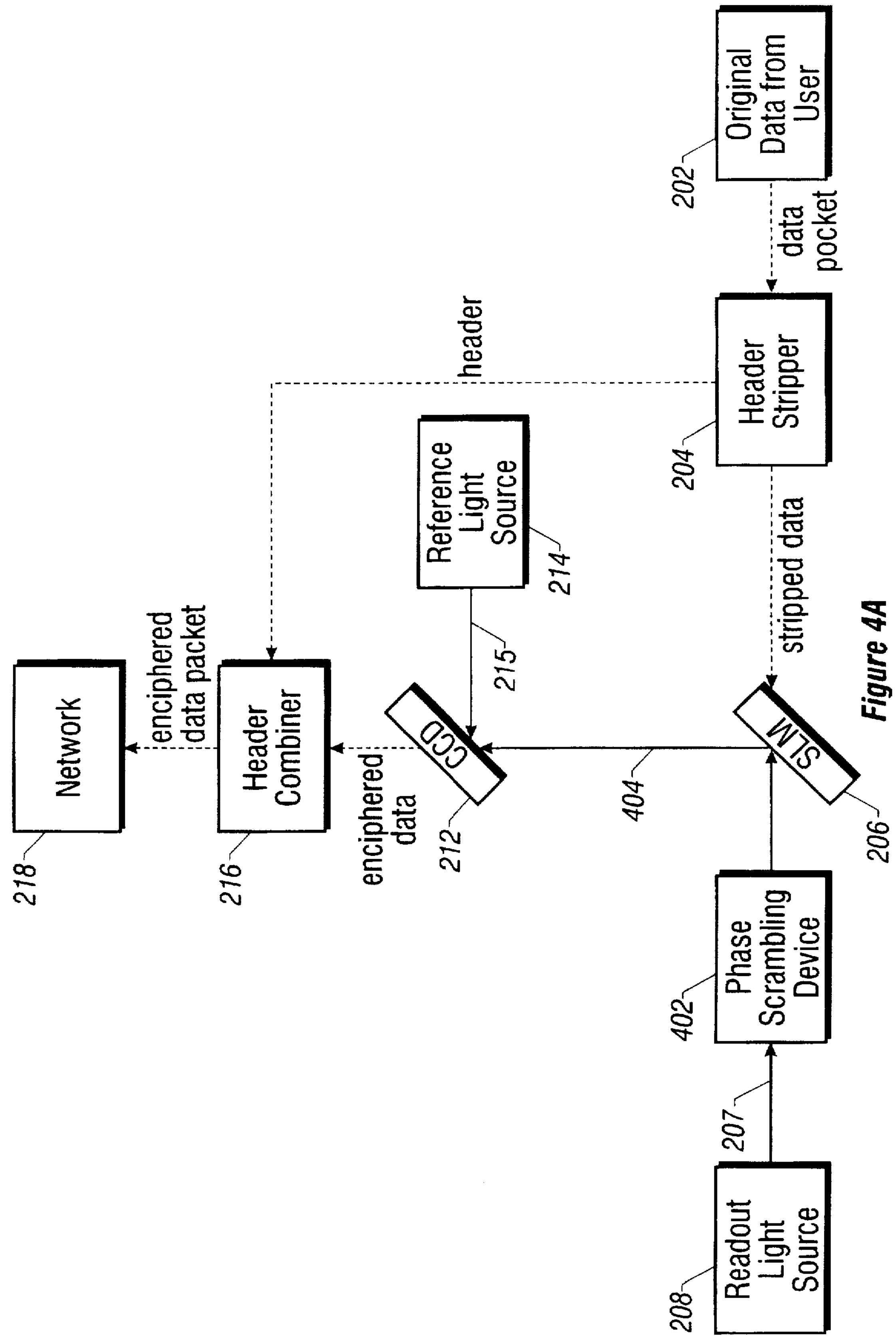
FIG. 4*a* shows the second embodiment of the optical enciphering device in accordance with the present invention.
Figure 4B:
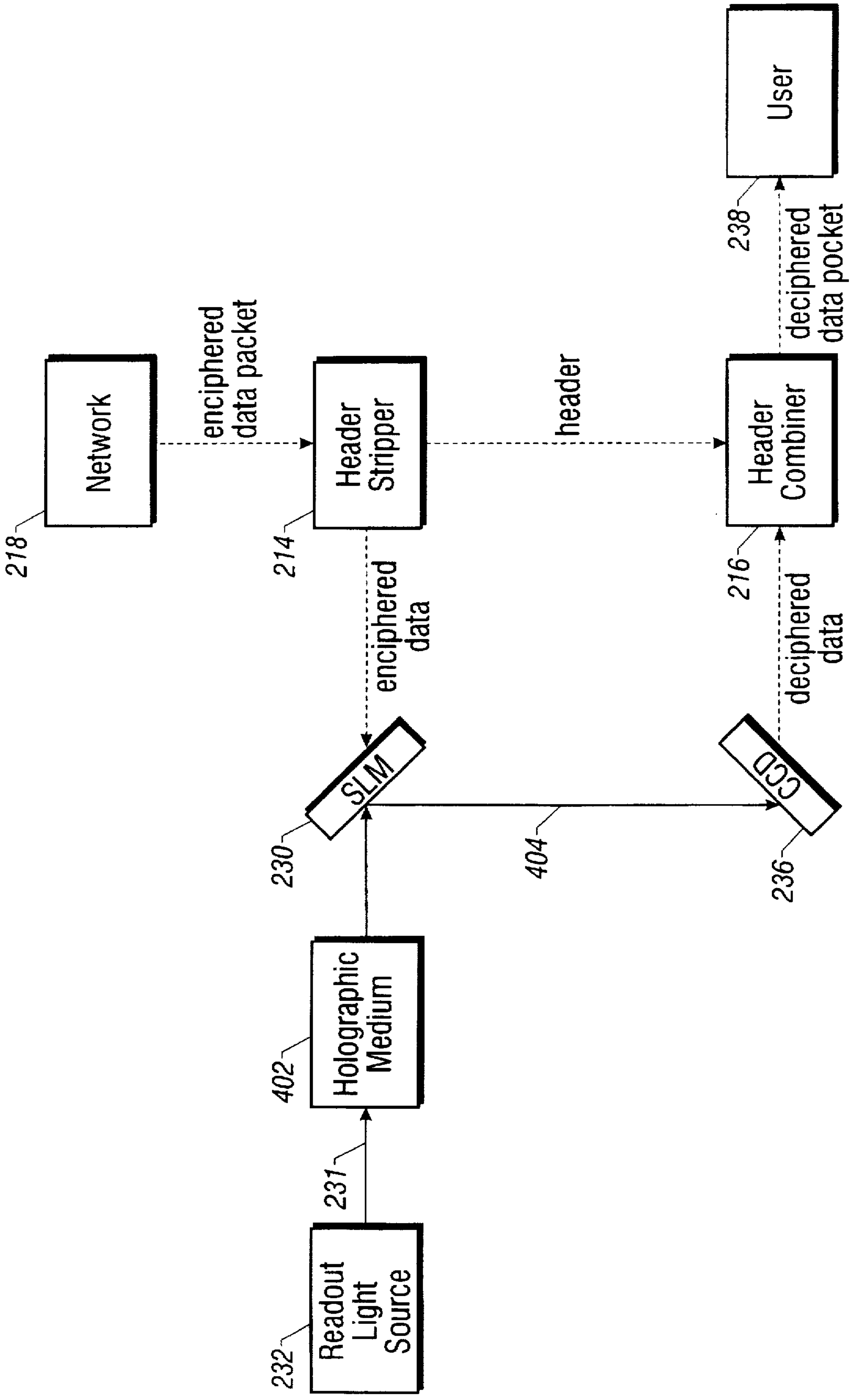
FIG. 4*b* shows the first embodiment of the optical deciphering device corresponding to the enciphering device in FIG. 4*a*.

FIG. 4*a* is a second embodiment of the optical encryption interface in accordance with the present invention. A phase scrambling device 402 is disposed in the readout beam 207 to scramble the phase thereof before it is imprinted with information by the addressing SLM 206. The respective deciphering interface is shown in FIG. 4*b*. The phase scrambling device 402 is placed in the optical path of a readout beam 231 propagating in the opposite direction of the writing reference beam 215. The distance between the phase scrambling device 402 and the reconstruction SLM 230 is substantially identical to that between the phase scrambling device 402 and the addressing SLM 206 in FIG. 4*a*. The image in the output beam 404 from the SLM 230 is restored.

Figure 5A:
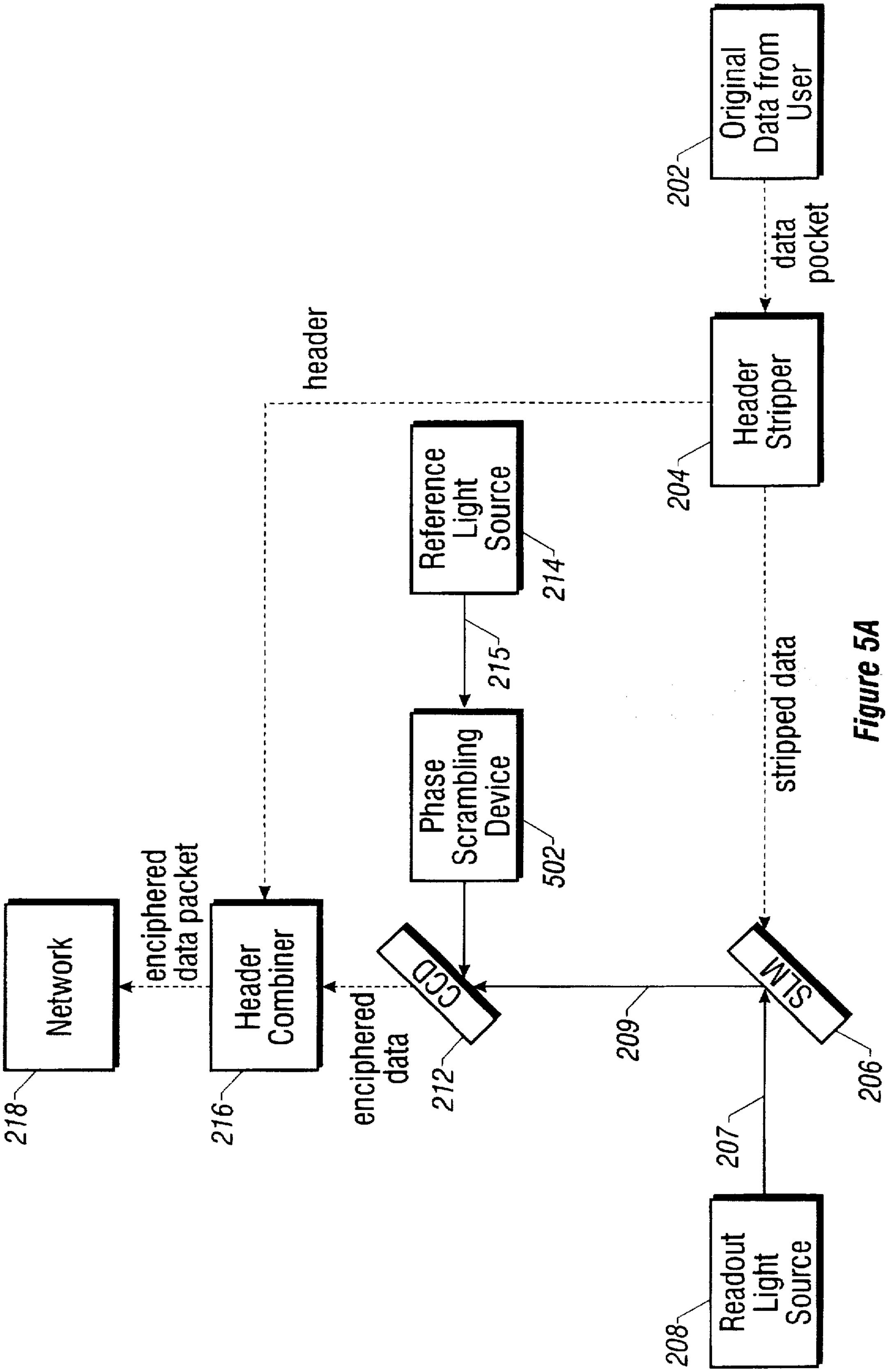
FIG. 5*a* shows the third embodiment of the optical enciphering device in accordance with the present invention.
Figure 5B:
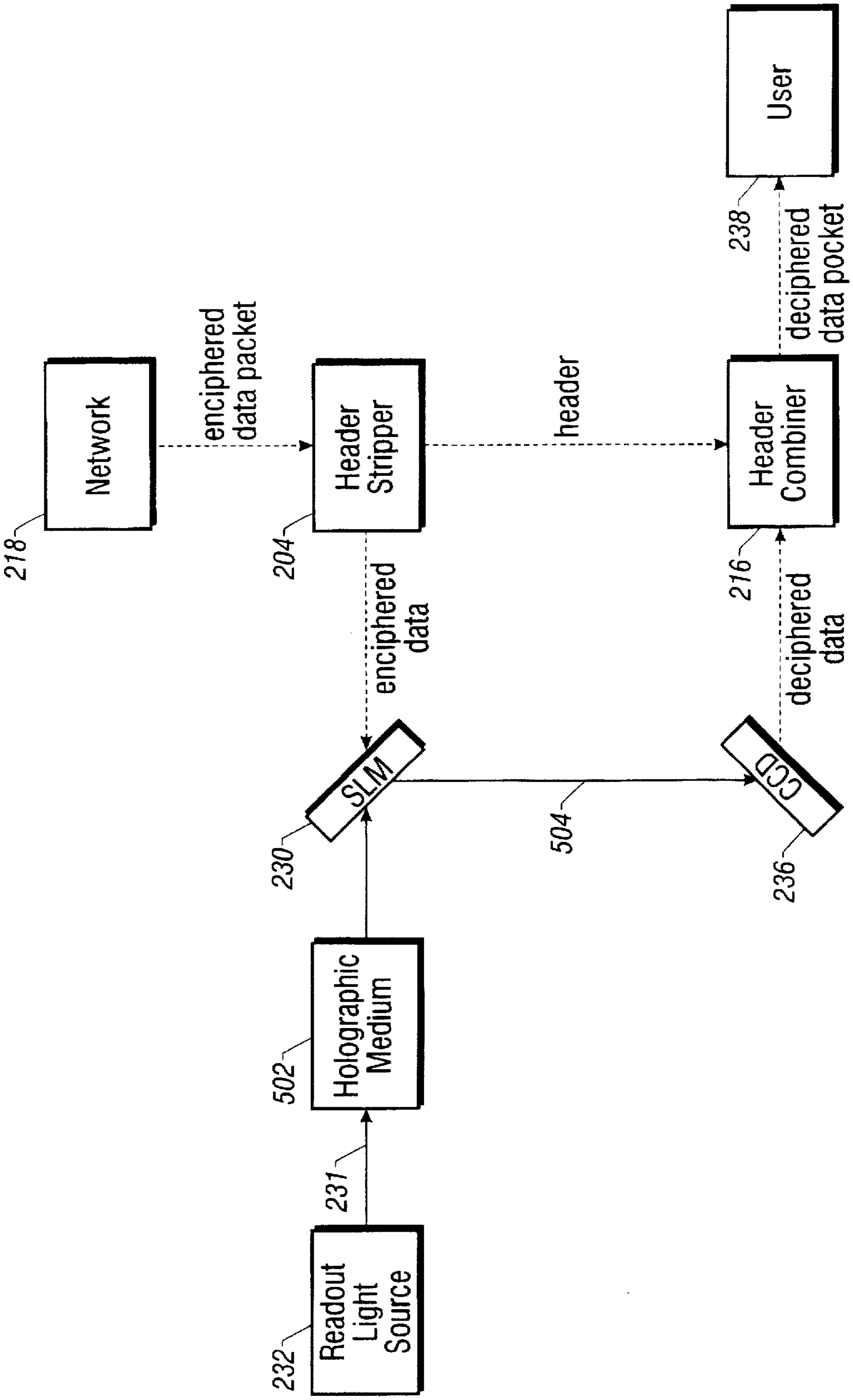
FIG. 5*b* shows the first embodiment of the optical deciphering device corresponding to the enciphering device in FIG. 5*a*.

A third embodiment of the optical encryption interface in accordance with the present invention is shown in FIG. 5*a*. A phase scrambling device 502 is placed in the optical path of the reference beam 215 to scramble the phase thereof. The readout beam 207 is modulated by the SLM 206 and directed to the CCD 212 as an imprinted beam 209. The phase-scrambled reference beam 215 interferes with the imprinted beam 209 to form a hologram on the CCD 212. The respective deciphering interface is shown in FIG. 5*b*. The phase scrambling device 502 is placed in the optical path of a readout beam 231 propagating in the opposite direction of the writing reference beam 215. The distance between the phase scrambling device 402 and the reconstruction SLM 230 is substantially identical to that between the phase scrambling device 502 and the CCD 212 in FIG. 5*a*. The image in the output beam 504 from the SLM 230 is restored to the original image in the beam 209 of FIG. 5*a* except a scaling factor in amplitude.

A fourth embodiment of the present invention has the enciphering and deciphering interfaces similar to the ones in FIG. 2*a* and FIG. 2*b* except that the optical phase scrambling device 210 is eliminated in FIG. 2*a* and the holographic medium 234 is eliminated in FIG. 2*b*. According to this embodiment, a random phase distribution is generated electronically by adding random amplitude offset to each pixel of the CCD 212 or the SLM 206 with an electronic device connected to the CCD 212 or the SLM 206. In receiving the enciphered data, this random amplitude offset is eliminated by subtracting the identical amplitude offset either from the CCD 236 or the SLM 230.

The inventor further contemplates that the optical encryption in accordance with the present invention which is essentially a hardware encryption system can be combined with a software encryption system to further enhance the security in data transmission and storage. Such software encryption includes, but is not limited to, DES system, RSA system, Triple DES, REDOC, Khufu, and IDEA.

In summary, the present invention describes unique optical encryption methods and systems that are based on analog processes. According to the present invention, the optical encryption includes at least the following steps. First, sequential digital data including electronic images, voice data, video data and others is converted into two-dimensional optical images. Secondly, the phase of the optical images is distorted by either using an optical phase scrambling device or using electronic techniques. Thirdly, the distorted optical images are recorded as optical holograms. And lastly, the holograms are converted back as encrypted sequential digital data for transmission over a network. The respective decryption in accordance with the present invention includes converting the optically encrypted sequential digital data into two dimensional holograms, reconstruction of the holograms using proper hardware devices in a proper configuration based on the encryption process, unscrambling the phase of the reconstructed optical images from the holograms, and conversion of the 2D images into deciphered sequential digital data.

The phase scrambling process and holographic recording in accordance with the present invention substantially reduce the possibility for any brute-force method to invade the encryption system. Some features to achieve the high security of the above-disclosed optical encryption are as follows. First, the phase scrambling process is based on an analog process using an optical or electronic device. Therefore, the device is needed and is desirable to operate in a proper configuration in decrypting the optically encrypted data. For example, a holographic film having the phase information of the phase scrambling device used in the encryption process is needed to undo the phase scrambling. Merely having the holographic film is not sufficient since the film has to be placed in a desired position with a desired orientation relative to the polarization of the light. Secondly, the holographic process of converting the distorted optical images into holograms effectively enciphers the phase-encoded data for the second time. This second encoding is done by controlling the holographic recording through parameters including the polarization properties, the relative propagation angle, and the wavelength of the recording beams. It is necessary to have both the hardware and the detailed information of the operational configuration thereof to properly reconstruct the images. Thirdly, such an optical encryption system cannot be easily invaded by using an algorithm.

Although the present invention has been described in detail with reference to several embodiments with a certain degree of particularity and specificity, one ordinarily skilled in the art to which this invention pertains will appreciate that various modifications and enhancements may be made without departing from the spirit and scope of the following claims.

What is claimed is:

1. An encryption device operable to encrypt electronic data according to an algorithm, comprising:
- a first electro-optical device, receiving electronic data and converting said electronic data into a two dimensional optical image
- a second electro-optical device, disposed relative to said first electro-optical device and configured to receive an optical indicia of said optical image and to produce a two dimensional electrical signal array indicative of said optical image; and
- an encryption device operable to cause said electrical signal array to be encrypted according to a key to form an encrypted electrical signal array.

2. A system as in claim 1, wherein said encryption device includes a phase modulating device, said phase modulating device operating to effect a phase modulation as said key in said electrical signal array produced by said second electro-optical device to form said encrypted electrical signal array.

3. A system as in claim 2, wherein said phase modulating device includes an optical element selected from a group at least consisting of a holographic medium, a phase spatial light modulator, and a multimode waveguiding medium.

4. A system as in claim 2, wherein said phase modulating device is an electronic device, operating to add said phase modulation to at least one of said first electro-optical device and said second electro-optical device.

5. A system as in claim 1, wherein said first electro-optical device is a spatial light modulator and said second electro-optical device is a two-dimensional light detector array.

6. A system as in claim 5, wherein said two dimensional light detector array is a CCD array.

7. A system as in claim 1, wherein said electrical signal array is indicative of an optical hologram having phase and intensity information of said optical image from said first electro-optical device.

8. A system as in claim 1, wherein said key is at least in part based on an algorithm selected from a group consisting of DES, RSA, Triple DES, REDOC, Khufu, and IDEA.

9. An information encryption system, comprising:
- a first light source for producing a first signal light beam and a first reference light beam which are mutually coherent to each other;
- a first electro-optical spatial light modulator having a two dimensional spatial array of pixels for modulating light and being disposed to receive said first signal light beam, said first light modulator operating to convert a first serial data stream into a first two-dimensional spatial pattern on said spatial array and to impress said first spatial pattern onto said first signal light beam to form a two dimensional optical image, wherein said first signal light beam impressed with said optical image and said first reference light beam are directed to overlap and interfere with each other to produce a first interference pattern according to a first predetermined relationship between said first signal light beam and said first reference light beam;
- a first two-dimensional light detector array, disposed relative to said first light modulator to receive said first interference pattern and configured to convert said first interference pattern into a first electrical signal array; and
- an encryption device operable to cause said first electrical signal array to be encrypted according to an encryption key to form a first encrypted electrical signal array, wherein said first encrypted electrical signal array is converted into an encrypted serial digital data stream.

10. A system as in claim 9, wherein said encryption device includes a first phase modulating device, producing a first phase modulation on one of said first signal light beam and said first reference light beam.

11. A system as in claim 10, wherein said first phase modulating device is located in the optical path of said first signal light beam between said first light modulator and said first detector array.

12. A system as in claim 10, wherein said first phase modulating device is disposed to modulate said first signal light beam prior to impressing said first spatial pattern onto said first signal light beam by said first light modulator.

13. A system as in claim 10, wherein said first phase modulating device is disposed to modulate said first reference light beam prior to said interference with said first signal light beam.

14. A system as in claim 10, wherein said first phase modulating device includes an element selected from a group at least consisting of a holographic medium, a phase spatial light modulator, and a multimode waveguiding medium.

15. A system as in claim 10, wherein said first phase modulating device is an electronic device electrically connected to one of said first light modulator and said first detector array and configured to add a random phase distribution to said first phase modulation.

16. A system as in claim 9, further comprising:

a second light source operable to produce a second signal light beam having a second predetermined relationship with said first reference beam; and an optical decryption device operable to use said second signal beam to convert said encrypted serial digital data stream into a decrypted digital data stream substantially identical to said first digital data stream by performing an optical decryption process.

17. A system as in claim 16, wherein said optical decryption device includes:

a second electro-optical spatial light modulator disposed to receive said second signal light beam and configured to convert said encrypted serial data stream into a second two-dimensional interference pattern substantially identical to said first interference pattern, said second light modulator operable to impress said second interference pattern onto said second signal light beam.

18. A system as in claim 17, wherein:

said encryption device is configured to include a first phase modulator operating to produce a first phase modulation to one of said first signal light beam and said first reference light beam to effect said encryption of said first electrical signal array;

said optical decryption device is configured to include a second phase modulator to produce a second phase modulation associated with said first phase modulation to said second signal light beam, said second phase modulator being so positioned with respect to positioning of said first phase modulator relative to said first light modulator and said first detector array that said second phase modulator and said second light modulator operating in combination to produce a third beam having a second spatial pattern substantially identical to said first spatial pattern and propagating in a direction having a relation with respect to said first signal beam; and is configured to further comprise:

a second two-dimensional detector array, disposed relative to said second light modulator to have a spatial relation therebetween substantially identical to a relative spatial positioning of said first detector array and said first light modulator, said second detector operating to receive said third signal beam and convert said second spatial pattern therein into said decrypted digital data stream.

19. A system as in claim 18, wherein both said second signal beam subsequent to said impressing by said second light modulator and said third beam retrace said first signal light beam in a time reversed manner.

20. A system as in claim 18, wherein said second phase modulator includes a holographic medium having a hologram therein that is associated with said first phase modulation by said first phase modulator.

21. A system as in claim 18, further comprising:

a first electronic device, electrically connected to said first spatial light modulator, operating to split said first serial digital data stream into a first portion and a second portion, said second portion being sent to said first spatial light modulator; and a second electronic device, electrically connected to said first detector array, operating to combine said first portion of said first serial digital data stream and said encrypted serial digital data stream.

22. A system as in claim 16, wherein said second relationship of said second signal light beam with said first reference beam includes a property selected from a group at least consisting of propagating direction, wavelength, and polarization.

23. A system as in claim 9, wherein said first light source comprises a first light emitting device to produce said first signal light beam and a second light emitting device to produce said first reference light beam.

24. A system as in claim 9, wherein said first light source includes at least one diode laser.

25. A system as in claim 9, wherein said two dimensional light detector array is a CCD array.

26. A method of encrypting electronic data, comprising:

transforming a serial stream of data into a first two-dimensional spatial array of electrical signals;

using said first spatial array of electrical signals to modulate a wavefront of a signal beam to produce a modulated signal beam which carries a spatial image indicative of said first spatial array of electrical signals;

providing a reference light beam which is coherent with said signal beam and propagating relative to said modulated signal beam;

spatially overlapping said reference beam and said modulated signal beam according to a predetermined criterion to form interference fringes;

converting said interference fringes into a second two-dimensional spatial array of electrical signals;

encrypting said second spatial array of electrical signals by using a first key to form an encrypted second spatial array of electrical signals; and transforming said encrypted second spatial array of electrical signals into a serial stream of encrypted data in time domain.

27. A method as in claim 26, wherein said first key includes a first phase modulation.

28. A method as in claim 27, wherein said first phase modulation is an optical phase modulation applied on said signal beam, thus resulting in said first phase modulation in said second spatial array of electrical signals.

29. A method as in claim 27, wherein said first phase modulation includes an optical phase modulation applied on said reference beam, thus resulting in presence of said first phase modulation in said second spatial array of electrical signals.

30. A method as in claim 27, wherein said first phase modulation includes an electronic phase modulation in said first spatial array of electrical signals to cause said first phase modulation in said second spatial array of electrical signals.

31. A method as in claim 27, wherein said first phase modulation includes an electronic phase modulation in said step of converting of said interference fringes into said second two-dimensional spatial array of electrical signals.

32. A method as in claim 27, further comprising:

transforming said encrypted data into a third two-dimensional spatial array of electrical signals that is substantially identical to said second spatial array of electrical signals;

modulating a read light beam with said third spatial array of electrical signals to generate a reconstruction beam whose wavefront is an optical indicia of said third spatial array of electrical signals;

converting said reconstruction beam into a fourth two-dimensional spatial array of electrical signals;

causing a second phase modulation in said fourth spatial array of electrical signals, wherein said second phase modulation has a phase relationship with said first phase modulation so as to substantially undo said first phase modulation; and transforming said fourth spatial array of electrical signals into a serial stream of decrypted data in time domain that is substantially identical to said serial stream of data.

33. A method as in claim 32, wherein said read light beam counterpropagates said reference beam relative to said third spatial array of electrical signals with respect to propagation of said reference beam relative to said second spatial array of electrical signals and said reconstruction beam is substantially identical to the phase conjugate of said modulated signal beam.

34. A method as in claim 26, wherein said predetermined criterion includes wavelength, polarization, and relative propagating direction of said modulated signal beam and said reference beam.

35. A data transmission system based on optical encryption, comprising:

a transmission terminal having a first two dimensional spatial light modulator operable to convert electronic data into a first two dimensional optical image in a first read light beam and a first two dimensional light detector array operable to convert a first optical hologram of said first optical image into encrypted electronic data, wherein said encrypted electronic data is produced at least in part by effecting a first phase modulation in said first optical hologram; and a receiving terminal having a second two dimensional spatial light modulator operable to convert said encrypted electronic data into a second two dimensional optical image in a second read light beam and a second two dimensional light detector array operable to convert said second optical image into said electronic data by applying a second phase modulation which removes said first phase modulation from said second optical image.

36. A system as in claim 35, further comprising a data communication channel connecting said transmission and receiving terminals to transmit said encrypted electronic data.

37. A system as in claim 36, wherein said data communication channel is connected to a communication network.

38. A system as in claim 37, wherein said data communication channel is connected to the Internet.

39. A system as in claim 35, wherein said first phase modulation is carried out electronically by said first spatial light modulator.

40. A system as in claim 35, wherein said first phase modulation is carried out electronically by said first light detector array.

41. A system as in claim 35, further comprising an optical phase scrambling medium in the optical path of said first read light beam to optically produce said first phase modulation.

42. A system as in claim 35, wherein said first optical hologram is formed by interfering a first reference beam with said first read light beam and further comprising an optical phase scrambling medium in the optical path of said first reference beam to optically produce said first phase modulation.

43. A system as in claim 41 or 42, wherein said optical phase scrambling medium is a holographic medium or a phase spatial light modulator.

44. A system in claim 41 or 42, wherein said optical phase scrambling medium is a multimode waveguiding medium which is operable to further add redundancy in said encrypted electronic data produced by said transmission terminal.

45. An encryption system operable to encrypt electronic data according to an algorithm, comprising:

a two dimensional spatial light modulator operable to convert electronic data into a two dimensional optical image in a read light beam; and a two dimensional light detector array operable to convert a optical hologram of said optical image which is formed by interfering said read light beam with a reference beam into encrypted electronic data, wherein said encrypted electronic data is produced by a first encryption based on a phase scrambling mechanism and a second encryption based on formation of said optical hologram.

46. A system as in claim 45, further comprising an optical phase scrambling device which is disposed to impress an optical phase modulation upon one of said read light beam and said reference beam to effect said first encryption.

47. A system as in claim 45, wherein said first encryption is a phase modulation that is electronically performed in one of said spatial light modulator and said light detector array.

48. A system as in claim 46 or claim 47, wherein said second encryption is based on at least one of propagating direction, wavelength, and polarization of said read light beam and said reference beam.

* * * * *

UNITED STATES PATENT AND TRADEMARK OFFICE

CERTIFICATE OF CORRECTION

PATENT NO. : 5,793,871
DATED : August 11, 1998
INVENTOR(S) : Deborah J. Jackson

It is certified that error appears in the above-identified patent and that said Letters Patent is hereby corrected as shown below:

Drawings,
In Figure 4B, the numeral label for box "Header Stripper" should be changed from "214" to -- 204 --.

Signed and Sealed this

Eighth Day of February, 2005

JON W. DUDAS
*Director of the United States Patent and Trademark Office*

UNITED STATES PATENT AND TRADEMARK OFFICE

CERTIFICATE OF CORRECTION

PATENT NO. : 5793871
DATED : August 11, 1998
INVENTOR(S) : Deborah J. Jackson

It is certified that error appears in the above-identified patent and that said Letters Patent is hereby corrected as shown below:

Column 3,
Line 1, delete “method.”
Line 21, replace replace with -- using the same key that is used to encipher it. --

Signed and Sealed this

Twenty-second Day of March, 2005

JON W. DUDAS
*Director of the United States Patent and Trademark Office*